United States Patent
Grossman et al.

(10) Patent No.: US 7,302,128 B2
(45) Date of Patent: Nov. 27, 2007

(54) FIBER OPTIC SWITCH

(75) Inventors: Barry Grossman, Melbourne, FL (US); Sachin N. Dekarte, Coimbatore (IN)

(73) Assignee: Florida Institute of Technology, Melbourne, FL (US)

(*) Notice: Subject to any disclaimer, the term of this patent is extended or adjusted under 35 U.S.C. 154(b) by 65 days.

(21) Appl. No.: 10/906,676

(22) Filed: Mar. 1, 2005

(65) Prior Publication Data
US 2005/0196093 A1    Sep. 8, 2005

Related U.S. Application Data

(60) Provisional application No. 60/549,197, filed on Mar. 2, 2004.

(51) Int. Cl.
  *G02B 6/26*    (2006.01)
  *G02F 1/295*    (2006.01)
  *G02F 1/335*    (2006.01)

(52) U.S. Cl. .................. 385/16; 385/4; 385/7; 385/24; 385/27; 385/37; 385/39

(58) Field of Classification Search ................. 385/16, 385/4, 7–9, 10, 27, 28, 24, 37, 39
See application file for complete search history.

(56) References Cited

U.S. PATENT DOCUMENTS 5,748,825 A * 5/1998 Rockwell, III ............. 385/126

* cited by examiner

*Primary Examiner*—Frank G. Font
*Assistant Examiner*—Michael P. Mooney
(74) *Attorney, Agent, or Firm*—Joel I. Rosenblatt

(57) ABSTRACT

A fiber optic switch uses induced periodic variations in a multi-mode optic fiber, to control power loss in the switch and power output.

20 Claims, 2 Drawing Sheets

FIBER OPTIC SWITCH

Applicant claims the benefit of Provisional Application 60/549,197, filed Mar. 2, 2004.

FIELD OF INVENTION

This invention is in the field of optical switching in telecommunications.

BACKGROUND OF THE INVENTION

Current technology of switching is optical-electronic-optical, i.e., optical signals are converted to electrical ones that drive lasers down the fiber to which the signal needs to be switched to. This method has the following disadvantages:

Slow, due to the overhead associated with conversion to electrical and back to optical.

Expensive, due to the need for high speed switching electronics

Bulky. Compared to optical elements, these switches are orders of magnitude bulkier due to electronic systems that go along with them.

Wavelength-dependent operation.

Unlike electrical systems, the all-optical switching technology is still in its infancy and newer systems are being invented at a rapid pace. Currently all-optical switches are commercially available and have the following advantages over their electronic-based counterparts:

Fast, because the overhead of conversion to electrical and back to optical is eliminated.

Relatively inexpensive.

Small and compact.

The major disadvantage of many all-optical switches is operational dependence on the wavelength of light used. This is a source of concern in DWDM systems where signals "riding" on different wavelengths called carrier wavelengths need to be switched. Apart from the inherent advantages of all-optical switches, our technique has the advantage of being independent of wavelength. Some all-optical switches have losses due to reflection/refraction and are located external to the fiber.

These and other disadvantages of optical electrical optical and all optical switches are overcome by the invention as disclosed in a preferred embodiment.

SUMMARY OF THE INVENTION

The telecommunications industry continuously looks for inexpensive ways to increase bandwidth and data rates. Optical switching is an integral part of today's fiber optic-based communication networks. The advantages of all-optical switching techniques over traditional electronic-based ones are: increased speed due to the removal of the bottle-neck of optical-electrical-optical conversion, reduced cost by the elimination of high-speed electronics, smaller size due to is relative non-complexity when compared to electrical switching systems, etc. Some of the switches are relatively simple and inexpensive to construct, while others are very expensive to fabricate. But these all-optical switches are wavelength-dependent and require a different switch design and implementation for each operating wavelength. This can also be a disadvantage for multi-wavelength systems including wavelength division multiplexed systems.

As shown in the disclosed inventive principles for a preferred embodiment, is a fiber optic device that can be implemented in various applications: an all-optical Single Pull Single Throw (SPST) switch, a variable attenuator, external digital modulator and external analog modulator. The SPST all-optical switch can be scaled to a 1:N switching application by the use of a 1:N optical splitter. The device can be used to attenuate the levels of light to varying degrees in its implementation as a variable attenuator. Some applications that have continuous wave lasers require external modulator to modulate the output. This modulation could have to be analog or digital and our device can be used in both the analog as well as the digital applications.

The fiber optic device as disclosed, is based on the principle of inter-modal coupling due to induced periodic index variations in the core of the optical fiber. As shown by the disclosed inventive principles, light from a single mode fiber may be launched into a multi mode fiber exciting substantially or primarily, the first order mode.

The terms single mode and multi mode, optic fiber, as used herein refer to optic fiber, as would be known to those skilled in the art, which support low order modes or higher order modes, respectively and for the multi mode fiber, wherein the coupling coefficient for light from the lower order propagating modes to the higher order radiated modes in the fiber optic cladding is large, the light is radiated through the cladding and leaks or escapes from the optical fiber.

Inter modal coupling can be introduced by inducing periodic index variations using deformers placed at a pre-determined spacing. With the deformer rods placed at a pre-determined periodicity, a force on the deformer rods, presses down on the fiber and induce periodic variations in the index of refraction of the fiber core.

The force and extent of the deformation governs the amount of light lost by inter modal coupling into the higher order modes. A spatial filter at the fiber output can then filter out all the light except for the light in the first order mode. This reduces the total light transmitted to the following fibers. This inventive principle allows use of the preferred embodiment as a fiber optic inline, variable attenuator. As the device can be analog in its operation, the device is continuous from the ON state to the OFF state. In an acoustic transducer implementation of the device, it can be electronically actuated and therefore it can also be used as an external modulator to a Continuous Wave (CW) laser source. Use of the disclosed fiber optic device may be in applications where a highly reliable, fast method of modulation of a CW laser is required.

Because the operation of the device is continuous, it can be used as a digital and an analog external modulator.

As shown by the disclosed inventive principles for a preferred embodiment, light incident on the deformer induced periodic index variations, causes coherent light introduced into the fiber optic light path in a substantially first order mode to diffract into higher order modes and can eventually leak out of the fiber through the cladding.

As shown and described in the Detailed Description for a preferred embodiment, the fiber optic device may be implemented in one or more stages.

In a preferred embodiment, the multi mode fiber output of the first stage of a two stage device, is spliced to a single mode fiber of the second stage, with the single mode fiber serving as a spatial-modal filter that filters the first order mode from all the higher order modes. As would be known to those skilled in the art, this filtering is due to the difference in the core area mismatch of a single mode fiber when compared to a multi mode fiber.

In a preferred embodiment, an acoustic wave transducer or deformer is used in the first and second stages to introduce periodic index variations. In the disclosed preferred embodiment, double-induction of the deformer introduced periodic index variation enhances the fiber optic device extinction ratio.

As would be known to those skilled in the art, the disclosed inventive principles may be used in a one stage or multi stage device.

Light is introduced into a first state of a twostage fiber optic device through single mode fiber spliced to a multi mode fiber. As is well known to those skilled in the art, in a multi mode fiber the coupling coefficient for light from the lower order propagating modes to the radiated modes in the fiber optic cladding is large. In the fiber optic device, as shown by the disclosed inventive principles, coupling is in the multi mode region of the fiber, resulting in an efficient method for coupling of light between the lower order modes and the radiated cladding modes, where at the higher order modes, the light is radiated through the cladding and leaks or escapes from the optical fiber. Additionally, another advantage to the disclosed invention is produced by the substantially the same difference in propagating constants in the fiber for the lower order modes in a high V number (multi mode) fiber. This feature allows the same periodicity in the deformer induced index variation suffices for efficient coupling at any wavelength used, and a substantially wavelength independent fiber optic device. This feature permits use of the invention advantageously in Wavelength Division Multiplexed (WDM) systems, since its measured extinction ratio, approximately −80 dB, is wavelength independent.

In addition to the advantageous extinction ratio and substantially independent wavelength application, other advantages include: reliability, repeatability, speed, continuously adjustable attenuation or modulation, low insertion loss, and scalability to a 1:N all optical fiber optic switch.

These and other features of the invention, disclosed in its inventive principles in a preferred embodiment, will be apparent to those skilled in the art from the following Detailed Description.

What is shown and described for a preferred embodiment is a continuously adjustable transmissivity fiber optic switch, comprising, first means for conducting light; said first means comprising second means for exciting higher order modes by diffraction within said first means, causing a power loss in said first means; said second means comprising third means for inducing periodic index variations in said first means.

A continuously adjustable transmissivity fiber optic switch, comprising, a single mode optic fiber; a multi mode optic fiber connected to receive light from said single mode optic fiber, said multi mode optic fiber including induced periodic index variations; and a single mode optic fiber connected to receive light from said multi mode optic fiber, is shown by the following disclosed inventive principles.

As would be apparent to those skilled in the art, the disclosed inventive principles may be applied in embodiments other than the preferred embodiments disclosed herein, without departing from the disclosed invention.

DETAILED DESCRIPTION

Figure 1:
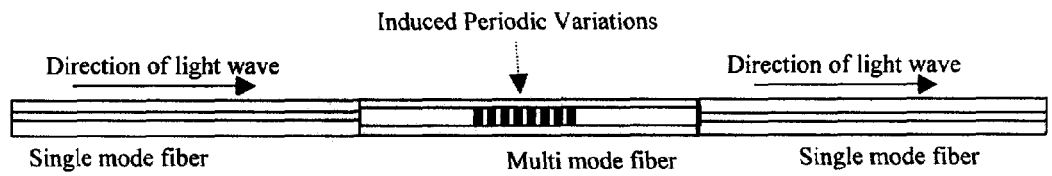
FIG. 1 shows in schematic form, the fiber optic device with a means placed to produce periodic index variations in the optic fiber.

The use of induced periodic variations in a multi mode fiber, by use of an acoustic wave transducer, as would be known to those skilled in the art, is shown by FIG. 1. In the disclosed invention, as shown for a preferred embodiment in a single stage fiber optic device, according to the disclosed inventive principles, light from a single mode fiber is directed into a multi mode fiber exciting the first order mode in the multi mode fiber. When the light is incident on the induced periodic index variations, produced by an acoustic wave transducer, as shown in a preferred embodiment in FIG. 1a, light from the first order mode is diffracted into higher order modes and the diffracted light at the higher modes, escapes or leaks from the optic fiber.

Where the output of the multi mode fiber, as shown in FIG. 1, is spliced to a single mode fiber, the multi mode to single mode splice acts as a spatial-modal filter that filters the first order mode from the higher order modes.

Figure 1A:
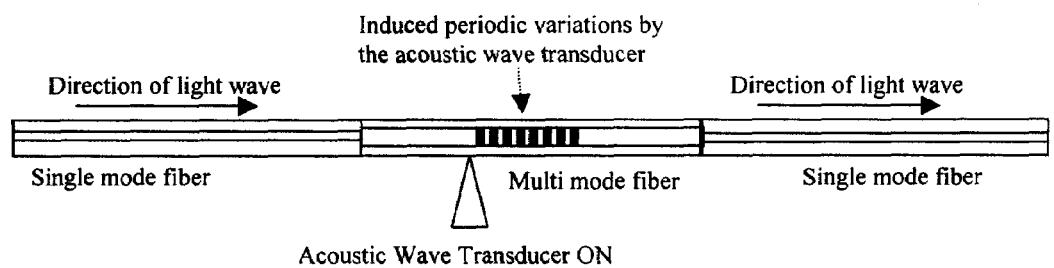
FIG. 1a shows in schematic form, the fiber optic device of FIG. 1, with an acoustic transducer as the means placed to produce periodic index variations in the optic fiber.
Figure 2:
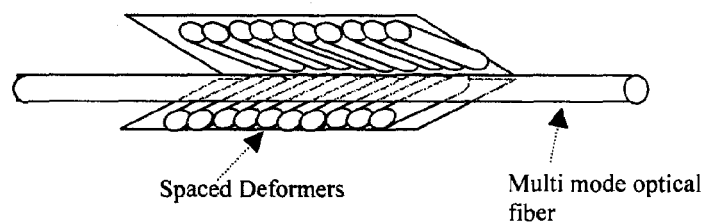
FIG. 2 shows in schematic form, deformer rods that can be used in place of the acoustic transducer, as shown in FIG. 1a, as the means placed to introduce a pre-determined periodicity and to produce periodic index variations in the optic fiber as shown in FIG. 1.

In place of the acoustic wave transducer, as shown in FIG. 1a, used as a means, as shown in FIG. 1, to induce the periodic variations in a multi mode fiber, a deformer, as shown for a preferred embodiment in FIG. 2, may be used. FIG. 2 shows a multi mode fiber optic cable between the deformer's plates. With a force applied to the deformer's plates, power loss occurs in the multi mode section of the switch resulting in overall power loss. The amount of power loss or attenuation can be controlled by adjusting the deformer spacing and the resulting induced periodic variations in a multi mode fiber produced, and by the force applied to the plates.

As would be known to those skilled in the art, The condition for efficient modal coupling to occur in a multi mode optical fiber with a graded index profile is given in Nicholas Lagakos, J. H. Cole and J. A. Bucaro, *Microbend fiber-optic sensor*, Applied Optics 11, n26, June 1987. As disclosed the condition is described as, $$L_c = (2\pi a n_0)/(NA)$$

Where;
$L_c$ is the mechanical spacing of the deformers
a is the core radius
$n_o$ is the on axis index of refraction of the core
NA is the numerical aperture of the fiber.

As would be apparent to those skilled in the art, the mechanical spacing of the individual deformer rods, as shown in FIG. 2, is independent of the optical wavelength of the light introduced into the switch.

In the acoustic transducer implementation of the device, the level of attenuated light depends on the periodicity of induced index variations. Where a deformer, as shown in FIG. 2, is used in place of the acoustic transducer, as shown in FIG. 1a, as the means for inducing periodic induced variations, the force and extent of the deformations and the induced periodic index variations produced, governs the amount of light lost. Using an acoustic transducer or deformer, the fiber optic device can be used as a fiber optic inline, variable attenuator. Being analog in nature, the device is continuous from the ON state all the way to the OFF state. In the acoustic transducer implementation of the device, it can be electronically actuated and therefore it can also be used as an external modulator to a Continuous Wave (CW) laser source. In applications where a highly reliable, fast method of modulation of a CW laser is required, this device can suffice. Since the operation of the device is continuous, it can be used as a digital and an analog external modulator.

Figure 3:
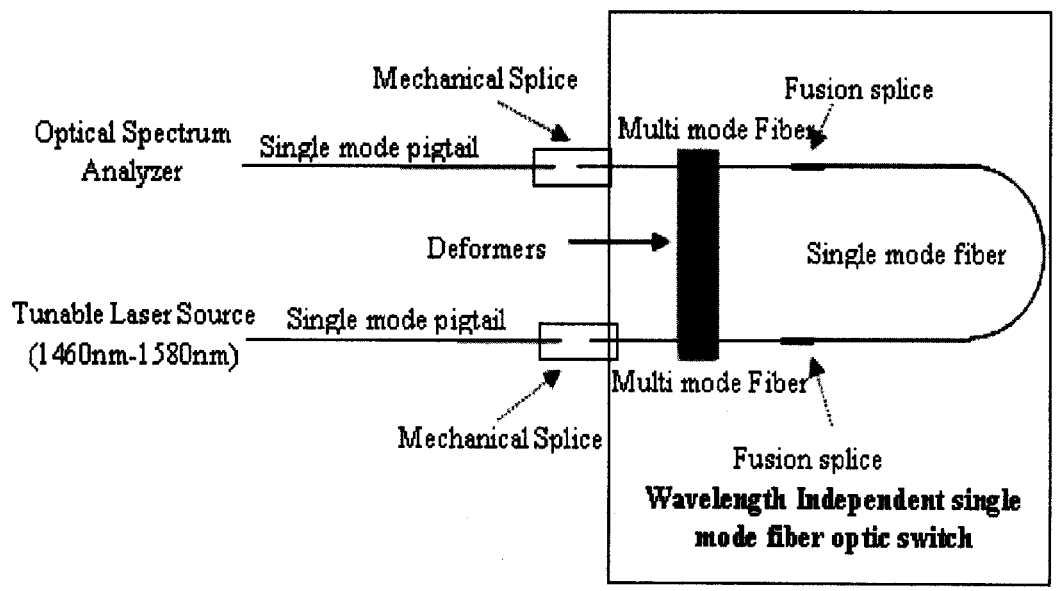
FIG. 3 shows in schematic form, the fiber optic device in a two stage preferred embodiment.

In a preferred embodiment, shown in FIG. 3, a two-stage fiber optic device is shown, according to the disclosed inventive principles. The two stage device may use as each of the single stages, any of the disclosed devices for producing the induced periodic index variations, the acoustic wave transducer the mechanical deformer, or any other suitable device as is now known or which may become known.

As shown in FIG. 3, the output of the first stage is into a single mode fiber, which serves as the input to the second stage, as described with reference to FIGS. 1 and 2. Using two or a plurality of stages, as shown and described with reference to FIGS. 1 and 2, improve the fiber optic device's control over the light in the filter and its transfer characteristic.

Figure 4:
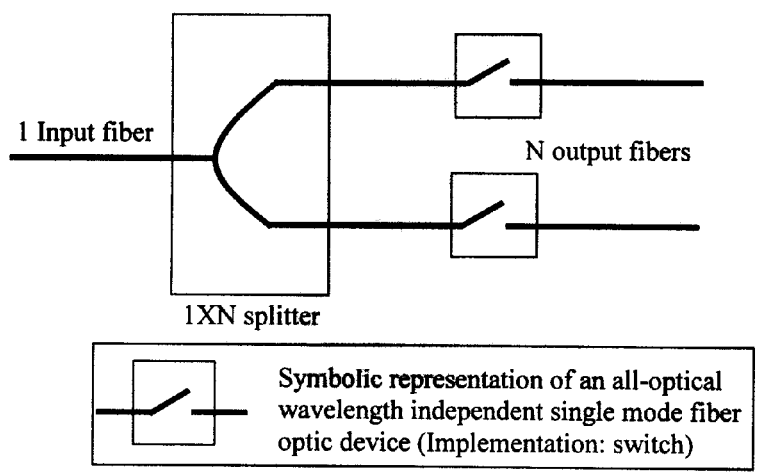
FIG. 4 shows in schematic form, the continuously adjustable transmissivity fiber optic device used to implement a 1:N switch.

As shown in FIG. 4, a 1:N splitter can be used in conjunction with N wavelength independent fiber optic devices to create a 1:N switch. Because the disclosed fiber optic device is wavelength independent, the same fiber optic device can be used for multiple wavelengths and for DWDM systems. For example, accurate switching can be achieved at by inducing the periodic index variations at speeds achievable by electronic actuation or by acousto-optic methods or by any other suitable method known or known in the future. Using electronic activation, the fiber optic device can be used as an external modulator for laser sources that are operated in Continuous Wave (CW) configuration. Due to its analog switching capability, it can also be used as an inline variable attenuator.

What is claimed is:

1. A continuously adjustable transmissivity fiber optic switch, comprising,
   first means for conducting light;
   said first means comprising second means for exciting higher order modes by diffraction within said first means, causing a power loss in said first means;
   said second means comprising third means for inducing periodic index variations in said first means; and wherein, said third means comprises means for deforming said second means to induce said periodic index variations.

2. The switch of claim 1, wherein, said second means comprises means to acoustically induce said periodic index variations.

3. The switch of claim 1, wherein, said power loss is produced by said higher modes leaking from said first means.

4. The switch of claim 1, wherein said second means includes means for varying the force applied to said means for deforming to vary said periodic index variations and said power loss.

5. The switch of claim 1, wherein, said third means comprises means for deforming said first means to induce said periodic index variation independently of the optical wavelength of light introduced into the first means.

6. The switch of claim 5, wherein said third means comprises means for mechanical spacing of individual deformer rods.

7. The switch of claim 6, wherein said second means includes means for varying the force applied to said means for deforming to vary said periodic index variations in relation to said mechanical spacing of the individual deformer rods.

8. The switch of claim 1, wherein said first means comprises means for conducting light in substantially a first order mode to means for conducting light in higher order modes and said means for inducing periodic index variations in said first means comprises means inducing periodic index variations in said means for conducting light in higher order modes.

9. The switch of claim 8, wherein said first means includes means conducting light in said substantially first order mode from said means for conducting light in said higher order for filtering substantially said first order mode from said higher order mode from said higher order modes.

10. The switch of claim 9, wherein said first means comprises means for a single stage filter and means combining a plurality of said first means arranged to conduct light in at least two stages.

11. A continuously adjustable transmissivity fiber optic switch, comprising, a single mode optic fiber; a multi mode optic fiber connected to receive light from said single mode optic fiber, said multi mode optic fiber including induced periodic index variations; and a single mode optic fiber connected to receive light from said multi mode optic fiber.

12. The switch of claim 11, including a deformer on said multi mode fiber and comprising mechanical spacing for inducing said periodic index variations.

13. The switch of claim 11, including an acoustic transducer for inducing said periodic index variations.

14. The switch of claim 12, including a force on said deformer to vary the extent of said induced periodic spacing.

15. The switch of claim 11, wherein said single mode optic fiber; said multi mode optic fiber connected to receive light from said single mode optic fiber, said multi mode optic fiber including induced periodic index variations; and a single mode optic fiber connected to receive light from said multi mode optic fiber, comprise a first single stage, and further comprising at least a second single stage connected to receive light from said first single stage.

16. The switch of claim 11, wherein said single order mode optic fiber and said multi mode optic fiber have substantially same difference in propagating constants.

17. The switch of claim 11, wherein, said multi mode optic fiber has a coupling coefficient allowing light from the higher order modes to be radiated in the optic fiber cladding.

18. The switch of claim 11, wherein said induced periodic variations are arranged in said multi mode fiber to produce inter modal coupling to higher order modes and said higher order modes are radiated into optic fiber cladding.

19. The switch of claim 11, wherein said single mode optic fiber connected to receive light from said multi mode optic fiber is arranged to be a spatial filter to filter substantially the higher modes of light from said multi mode fiber and reduce the light transmitted to said single mode optic fiber.

20. The switch of claim 1, wherein said third means comprises means for mechanical spacing of individual deformer rods.

* * * * *

UNITED STATES PATENT AND TRADEMARK OFFICE
CERTIFICATE OF CORRECTION

| | | |
|---|---|---|
| PATENT NO. | : 7,302,128 B2 | Page 1 of 1 |
| APPLICATION NO. | : 10/906676 | |
| DATED | : November 27, 2007 | |
| INVENTOR(S) | : Barry Grossman and Sachin N. Dekate | |

It is certified that error appears in the above-identified patent and that said Letters Patent is hereby corrected as shown below:

On the Title Page (75) The name of the second inventor is corrected to,

SACHIN N. DEKATE

Signed and Sealed this

Twenty Second Day of April, 2008

JON W. DUDAS
*Director of the United States Patent and Trademark Office*